(12) United States Patent
Gross

(10) Patent No.: US 9,317,760 B2
(45) Date of Patent: Apr. 19, 2016

(54) METHODS AND SYSTEMS FOR DETERMINING ASSESSMENT CHARACTERS

(71) Applicant: Xerox Corporation, Norwalk, CT (US)

(72) Inventor: Eric Michael Gross, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 50 days.

(21) Appl. No.: 14/252,162

(22) Filed: Apr. 14, 2014

(65) Prior Publication Data

US 2015/0294170 A1  Oct. 15, 2015

(51) Int. Cl.
G06K 9/18  (2006.01)
G06K 9/00  (2006.01)
G06K 9/52  (2006.01)

(52) U.S. Cl.
CPC ............. G06K 9/00852 (2013.01); G06K 9/52 (2013.01)

(58) Field of Classification Search
USPC ......... 382/182, 186, 187, 190, 209; 358/1.11, 358/537, 462
See application file for complete search history.

(56) References Cited

U.S. PATENT DOCUMENTS

| | | | | |
|---|---|---|---|---|
| 6,758,674 B2 * | 7/2004 | Lee | .................. | G09B 11/00 345/173 |
| 6,793,498 B1 * | 9/2004 | Nunes | .................. | G09B 5/065 434/322 |
| 8,005,273 B2 * | 8/2011 | Houle et al. | .................. | 382/119 |
| 8,064,817 B1 * | 11/2011 | Ziv-El | .................. | G09B 5/04 345/156 |
| 8,385,811 B1 * | 2/2013 | Gedlinske | .................. | G09B 3/06 434/322 |
| 8,521,077 B2 * | 8/2013 | Venable | .................. | 434/350 |
| 8,687,239 B2 * | 4/2014 | Eschbach et al. | .................. | 358/3.26 |
| 8,705,134 B2 * | 4/2014 | Campanelli et al. | .................. | 358/3.22 |
| 8,768,241 B2 * | 7/2014 | Venable | .................. | 434/362 |
| 2002/0123028 A1 | 9/2002 | Knowles et al. | | |
| 2006/0285749 A1 | 12/2006 | Eisenhart et al. | | |
| 2007/0237427 A1 | 10/2007 | Patel et al. | | |
| 2008/0063276 A1 | 3/2008 | Vincent et al. | | |
| 2012/0141967 A1 | 6/2012 | German et al. | | |
| 2012/0189999 A1 | 7/2012 | Uthman et al. | | |
| 2012/0282587 A1 | 11/2012 | Lofthus et al. | | |
| 2012/0284081 A1 | 11/2012 | Cheng et al. | | |
| 2012/0288841 A1 | 11/2012 | Srinivas et al. | | |
| 2013/0022284 A1 | 1/2013 | Zheng | | |
| 2013/0028502 A1 | 1/2013 | Nepomniachtchi et al. | | |
| 2014/0065594 A1 * | 3/2014 | Venable | .................. | 434/353 |
| 2015/0269862 A1 | 9/2015 | Gross et al. | | |

FOREIGN PATENT DOCUMENTS

EP  0042487 A2  12/1981
WO  WO-2008031063 A1  3/2008

* cited by examiner

*Primary Examiner* — Yosef Kassa
(74) *Attorney, Agent, or Firm* — Fox Rothschild LLP

(57) ABSTRACT

A method of determining an input character based upon character recognition output of an education assessment system may include receiving, by a processing device, a proposed value generated using character recognition. The proposed value may be associated with at least one handwritten character of an assessment. The method may include determining, by the processing device, whether the proposed value is correct, by determining a posterior probability associated with each of one or more possible characters, identifying the possible character associated with the posterior probability having a highest value, and in response to identifying the proposed value as the possible character associated with the posterior probability having a highest value, determining, by the processing device, that the proposed value is correct, otherwise, determining that the proposed value is incorrect.

27 Claims, 6 Drawing Sheets

|   | TRUE INPUT | | | | | | | | | |
|---|---|---|---|---|---|---|---|---|---|---|
|   | 0 | 1 | 2 | 3 | 4 | 5 | 6 | 7 | 8 | 9 |
| 0 | 95% | 0% | 0% | 0% | 0% | 0% | 3% | 0% | 0% | 2% |
| 1 | 0% | 90% | 0% | 0% | 0% | 0% | 0% | 3% | 0% | 0% |
| 2 | 0% | 0% | 89% | 0% | 0% | 0% | 0% | 2% | 0% | 0% |
| 3 | 0% | 0% | 2% | 96% | 0% | 2% | 0% | 0% | 3% | 0% |
| 4 | 0% | 0% | 0% | 0% | 88% | 0% | 0% | 0% | 0% | 15% |
| 5 | 0% | 0% | 2% | 0% | 0% | 89% | 7% | 0% | 0% | 0% |
| 6 | 0% | 0% | 0% | 0% | 0% | 4% | 90% | 0% | 4% | 0% |
| 7 | 0% | 10% | 6% | 4% | 0% | 0% | 0% | 96% | 0% | 2% |
| 8 | 2% | 0% | 0% | 0% | 0% | 4% | 3% | 0% | 92% | 2% |
| 9 | 3% | 0% | 1% | 0% | 12% | 1% | 0% | 2% | 1% | 79% |

CHARACTER RECOGNITION OUTPUT

402 ↓ TRUE INPUT

| | W | O | E | K |
|---|---|---|---|---|
| W | 0.88 | 0 | 0.02 | 0 |
| O | 0 | 0.97 | 0 | 0 |
| E | 0.02 | 0.03 | 0.92 | 0 |
| K | 0.1 | 0 | 0.06 | 1 |

404 → CHARACTER RECOGNITION ENGINE OUTPUT

CHARACTERIZATION FOR A HYPOTHETICAL SIMPLIFIED 4-LETTER ALPHABET

412 ↓ GIVEN IN 1st POSITION

| | W | O | E | K |
|---|---|---|---|---|
| W | 0.01 | 0.56 | 0.25 | 0.02 |
| O | 0.08 | 0.40 | 0.25 | 0.4 |
| E | 0.9 | 0.02 | 0.25 | 0.4 |
| K | 0.01 | 0.02 | 0.25 | 0.18 |

414 → PROBABILITY IN 2nd POSITION

FIG. 4B

METHODS AND SYSTEMS FOR DETERMINING ASSESSMENT CHARACTERS

BACKGROUND

The present disclosure relates to handwriting classification. More specifically, the present disclosure relates to improving automated handwriting character recognition and classification.

As the use of automated character recognition technology increases, education assessment systems are increasingly being used in various contexts, such as, for example, for student assessment testing, personnel testing assessment, job applicant competence assessment, and other similar testing situations.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of determining an input character based upon character recognition output of an education assessment system may include receiving, by a processing device, a proposed value generated using character recognition. The proposed value may be associated with at least one handwritten character of an assessment. The method may include determining, by the processing device, whether the proposed value is correct, by determining a posterior probability associated with each of one or more possible characters, identifying the possible character associated with the posterior probability having a highest value, and in response to identifying the proposed value as the possible character associated with the posterior probability having a highest value, determining, by the processing device, that the proposed value is correct, otherwise, determining that the proposed value is incorrect.

A method of determining one or more input characters based upon character recognition output of an education assessment system may include receiving, by a processing device, a proposed character string generated using character recognition. The proposed character string may be associated with a plurality of handwritten characters of an assessment of a student, and the proposed character string may include a first proposed character and a second proposed character. The method may include identifying one or more possible characters, and determining, by the processing device, whether the first proposed character is correct. The processing device may determine whether the first proposed character is correct by, for one or more of the possible characters, determining an ultimate probability that the first proposed character is the possible character given the character string by determining a first probability equal to a probability that if a true value of the first proposed character is the possible character that the first proposed character was identified, determining a second probability equal to a probability that if the true value of the first proposed character is the possible character that a following character is the second proposed character, determining a third probability equal to a probability that the student wrote the possible character, and determining a product of the first probability, the second probability and the third probability. The method may include selecting the ultimate probability having the highest value.

In an embodiment, a system of determining an input character based upon character recognition output may include a computing device and a computer-readable storage medium in communication with the computing device. The computer-readable storage medium may include one or more programming instructions that, when executed, cause the computing device to receive a proposed value generated using character recognition, where the proposed value is associated with at least one handwritten character of an assessment, and determine whether the proposed value is correct. A determination whether the proposed value is correct may be made by determining a posterior probability associated with each of one or more possible characters, identifying the possible character associated with the posterior probability having a highest value, and in response to identifying the proposed value as the possible character associated with the posterior probability having a highest value, determining, by the processing device, that the proposed value is correct, otherwise, determining that the proposed value is incorrect.

In an embodiment, a system of determining one or more input characters based upon character recognition output may include a computing device and a computer-readable storage medium in communication with the computing device. The computer-readable storage medium may include one or more programming instructions that, when executed, cause the computing device to receive a proposed character string generated using character recognition. The proposed character string may be associated with a plurality of handwritten characters of an assessment of a student, and the proposed character string may include a first proposed character and a second proposed character. The computer-readable storage medium may include one or more programming instructions that, when executed, cause the computing device to identify one or more possible characters and determine whether the first proposed character is correct. A determination as to whether the first proposed character is correct may be made by, for one or more of the possible characters, determining an ultimate probability that the first proposed character is the possible character given the character string by determining a first probability equal to a probability that if a true value of the first proposed character is the possible character that the first proposed character was identified, determining a second probability equal to a probability that if the true value of the first proposed character is the possible character that a following character is the second proposed character, determining a third probability equal to a probability that the student wrote the possible character, and determining a product of the first probability, the second probability and the third probability. The computer-readable storage medium may include one or more programming instructions that, when executed, cause the computing device to select the ultimate probability having the highest value.

BRIEF DESCRIPTION OF THE DRAWINGS

FIG. 3 illustrates an example input/output table according to an embodiment.

FIG. 4A depicts a second sample input/output probability table according to an embodiment.

FIG. 4B depicts a variation of the second sample input/output table as shown in FIG. 4A according to an embodiment.

DETAILED DESCRIPTION

Figure 1:
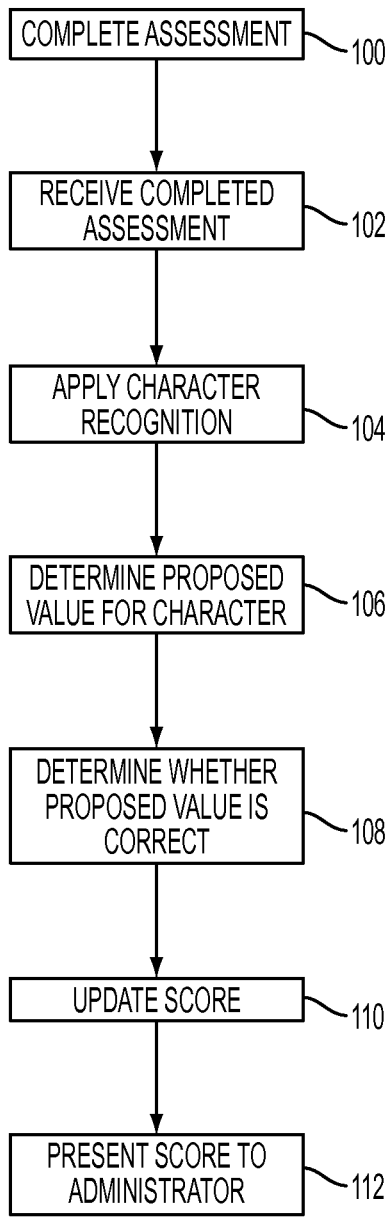
FIG. 1 illustrates a flow chart of an example method of evaluating an assessment according to an embodiment.

The following terms shall have, for purposes of this application, the respective meanings set forth below:

An "assessment" refers to an instrument for testing one or more skills that requires one or more handwritten answers. An assessment may be a quiz, a test, an essay, or other type of evaluation. In an embodiment, an assessment may be an instrument embodied on physical media, such as, for example, paper.

An "automated character recognition system" or "object character recognition (OCR) system" refers to a system or computing device configured to perform as the mechanical or electronic conversion of scanned or otherwise captured images of typewritten or printed text into machine-encoded/computer-readable text. An "intelligent character recognition (ICR) system" or "ICR engine" is an advanced OCR system that provides for fonts and different styles of handwriting to be learned by a computer during processing to improve accuracy and recognition levels. Although an ICR system is discussed throughout this disclosure, it is understood that an OCR or other character recognition systems may be used within the scope of this disclosure.

A "character" refers to a letter, a number, a symbol, a punctuation mark and/or the like.

A "computing device" or 'processing device" refers to a device that processes data in order to perform one or more functions. A computing device may include any processor-based device capable of communicating in a networked environment such as, for example, personal computers, servers, mainframes, gaming systems, televisions, and portable electronic devices such as smartphones, personal digital assistants, cameras, tablet computers, laptop computers, media players and the like. A computing device may interpret and execute instructions. As used in this description, a "computing device" may be a single device, or any number of devices having one or more processors that communicate with each other and share data and/or instructions.

An "educational assessment system" refers to a system or computing device configured to evaluate or otherwise analyze one or more assessments.

Reliable handwriting recognition, such as a highly accurate ICR system, is an important feature for providing highly accurate grading and assessment systems. Education assessment systems typically facilitate the transfer of student input from paper to digital form. For the foreseeable future, paper as a medium for communication will continue to play a significant role in education. Education assessment systems may have a number of unique features that, if properly exploited by a character recognition engine, may significantly improve performance over and above that which is typically experienced with conventional automated grading and assessment systems. For example, such features may include, without limitation, (i) knowledge of the student entering the information as well as knowledge as to the student's average performance level in the subject matter (e.g., is the student in the "A", "B", "C", or other grade range); (ii) knowledge of what should have been written if the student entered a correct answer; (iii) historical information related to a potentially large number of prior handwritten characters with the corresponding character's correct classification for one or more students, which may include, for example, information from past assignments and/or interactive grading conducted and evaluated by an educator or other similar supervisory person; and (iv) the ability to track and adapt the ICR engine performance over time. The techniques and processes described herein may act to exploit these features by using an integration of Bayes' method with a base ICR classifier. As used herein, Bayes' method refers to a theorem for mathematically manipulating conditional probabilities based upon a number of probability interpretations.

For example, the techniques as described herein may be used to assist in identifying which of the characters 0, 1, 2, 3, 4, 5, 6, 7, 8, or 9 has been written. One or more of the numbers may have been written on an assessment and a teacher using an education assessment system may wish to automatically identify what has been written by a particular student. Additional and/or alternate characters may be used within the scope of this disclosure.

FIG. 1 illustrates a flow chart of an example method of evaluating an assessment according to an embodiment. As illustrated by FIG. 1, an assessment may be completed 100 by a student. For example, a student may complete 100 at least a portion of an assessment by providing a handwritten answer for at least a portion of the assessment. For instance, an assessment may evaluate a student's math skills by asking the student to complete 100 certain mathematical equations. A student may complete 100 this assessment by writing answers to the equations on the assessment.

In an embodiment, the assessment may be provided as input to an educational assessment system. An educational assessment system may be a software application executing on or hosted by one or more computing devices that grades or otherwise evaluates one or more assessments. An educational assessment system may receive 102 a completed assessment. For instance, an educational assessment system may receive a scanned image of the completed assessment. The educational assessment system may apply 104 character recognition to a received completed assessment, and may determine 106 a proposed value for one or more characters of the assessment. For example, a proposed value for a character may be the output of applying ICR to the character. In an embodiment, the educational assessment system may determine 108 whether the proposed value is correct.

Figure 2:
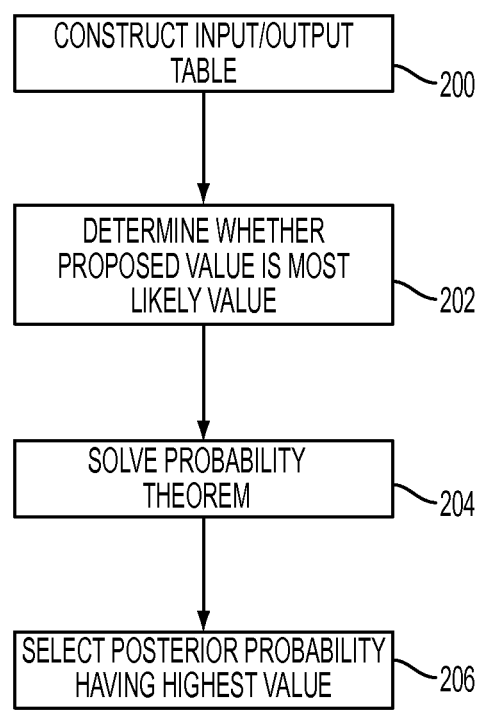
FIG. 2 illustrates a flow chart of an example method of determining whether a proposed value is correct according to an embodiment.

FIG. 2 illustrates a flow chart of an example method of determining 108 whether a proposed value is correct according to an embodiment. As illustrated by FIG. 2, an input/output table may be constructed 200. An input/output table may include one or more probability values for one or more pairs of values. FIG. 3 illustrates an example input/output table according to an embodiment. As illustrated by FIG. 3, the x-axis of the table may represent true input values. A true input value may represent a character that was actually written on an assessment. The y-axis of the table may represent a character recognition, such as ICR, output value. A character recognition output value may represent the value of a character as determined by an educational assessment system.

For example, the table illustrated in FIG. 3 indicates that the number '4', when written, is classified correctly as the number '4' approximately 85% of the time. In comparison, the number '4' is misclassified by the system as the number '9' approximately 15% of the time. Similarly, the number '8' is classified as an '8' approximately 92% of the time, is classified as a '3' approximately 3% of the time, is classified as a '6' approximately 4% of the time, and finally is classified as a '9' approximately 1% of the time.

In an embodiment, an input/output table may be constructed 200 for a particular student or other individual. For example, a student may complete one or more calibration forms. The handwriting on the calibration forms may be used by an education assessment system to generate an input/output table. Alternatively, the education assessment system may include a general performance table that is generated over a wide range of character samples which may be adapted over time as more and more handwriting samples are obtained for each student. In this way, each table may be unique to each student and, over time, each table may become more accurate for each student. Although an input/output table is referred to throughout this disclosure, it is understood that additional and/or alternate data structures may be used within the scope of this disclosure.

As illustrated by FIG. 2, an education assessment system may determine 202 whether a proposed value is the most likely value for the character. In an embodiment, a system may determine 202 whether a proposed value is the most likely value by solving 204 a probability theorem, such as Bayes' theorem. Bayes' theorem is defined as:

$$P(h \mid D) = \frac{P(D \mid h) P(h)}{P(D)}.$$

For purposes of this disclosure, P(h|D) is referred to as the posterior probability, P(D|h) is referred to as the probability of evidence, P(h) is referred to as the prior probability and P(D) is referred to as the prior probability of evidence. In certain embodiments, the applied probability theorem may not be normalized. For instance, Bayes' theorem may be represented by: P(h|D)=P(D|h)P(h).

More specifically, Bayes' theorem defines the probability of hypothesis h being true given the evidence D (e.g., the proposed value) is equal to the probability of D being true given h, times the probability of h, normalized by the probability of D. For example, $$P(9 \mid 4) = \frac{P(4 \mid 9) * P(9)}{P(4)}$$

may represent the probability that a '9' was actually written, but that the system interpreted the character as a '4.'

In an embodiment, a probability of evidence P(D|h) may be determined using the input/output table. For instance, using the above example, P(4|9)=0.12 according to the chart of FIG. 3.

In an embodiment, a prior probability P(h) may be determined based on information known about the student. For instance, P(h) may be determined based on historical assessment data for a student. The historical assessment data may include grade information for the student over a period of time. Historical assessment data may also pertain to a certain subject. For instance, the assessment example used above may be a math quiz. The education assessment system may determine that, based on historical assessment data, that the student is a C student in math. As such, the system may assign a probability P(h)=0.75, which may correspond to a C grade. The probability of other possibilities may be assigned a value equal to $$\frac{(1 - P(h))}{\text{total number of possibilities}}.$$

For example, in the above example, P(0), P(1), P(2), P(3), P(5), P(6), P(7), P(8) and P(9) may each have a value of $$\frac{(1 - 0.25)}{9} = 0.0833.$$

As another example, a system may recognize that a particular student has a habit of confusing division and multiplication. The most probable answer to the equation 4*2 may be '8' for the student. However, knowing that the student tends to confuse multiplication and division, the second most probable answer for the student may be '2' (i.e., 4/2). Additional and/or alternate historical assessment data, probabilities, grades and assignments may be used within the scope of this disclosure.

In an embodiment, a prior probability of evidence P(D) may be determined. Using the example above, P(4) may be determined. According to certain embodiments, P(4) may be represented as:

(P(4|0)*P(0))+(P(4|1)*P(1))+(P(4|2)*P(2))+
(P(4|3)*P(3))+(P(4|4)*P(4))+(P(4|5)*P(5))+
(P(4|6)*P(6))+(P(4|7)*P(7))+(P(4|8)*P(8))+
(P(4|9)*P(9))

Using the above input/output table values and the determined probabilities, P(4) may be equal to:

(0*0.027)+(0*0.027)+(0*0.027)+(0*0.027)+(0.88*0.027)+
(0*0.027)+(0*0.027)+(0*0.027)+(0*0.027)+
(0.12*0.75)=0.02376+0.09=0.114.

As such, $$P(9 \mid 4) = \frac{P(4 \mid 9) * P(9)}{P(4)} = \frac{0.12 * 0.75}{0.114} = 0.79.$$

Thus, there is an 79% chance that the character the student wrote was actually a '9' and not a '4' as interpreted by the system.

In an embodiment, a probability that one or more characters were actually written may be determined for one or more possible characters. For instance, using the above example, the system may use Bayes' theorem to determine the probability that the character is actually a different number for one or more possible numbers (i.e., 1, 2, 3, 5, 6, 7, 8, 9, 0). For example, the system may determine P (9|0), P (9|1), P (9|2), P (9|β), P (9|4), P (9|5), P (9|6), P (9|7), P (9|8), and P (9|9).

In an embodiment, the system may select 206 the posterior probability having the highest value. In the above example, the system may select P (9|4)=0.79 as the posterior probability having the highest value. If the proposed value is associated with the posterior probability having the highest value, then the system may determine that the proposed value is correct. If it is not, then the system may determine that the proposed value is not correct. For instance, referring back to the example, the proposed value was '4'. However, the posterior probability associated with '9' is the highest, so the system may determine that the proposed value is not correct.

Referring back to FIG. 1, in response to determining that the proposed value is not correct, the system may update 110 a score associated with the assessment. For instance, the system may give the student credit for a correct answer and may update 110 or adjust the score appropriately. In certain embodiments, the system may present 112 an administrator, such as a teacher or other educator, with the assessment score. For instance, the system may cause the score to be displayed on a display device, or may generate a report that includes the assessment score.

According to various embodiments, the processes as described in FIG. 1 and FIG. 2 may also be applied to one or more strings of consecutive characters because consecutive characters may not be statistically independent. Thus, the processes as described in FIG. 2 may be extended to consider one or more neighboring characters along with knowledge of what the correct answer should be and the quality of the student. A similar process may be used for grading and assessing spelling.

Figure 5:
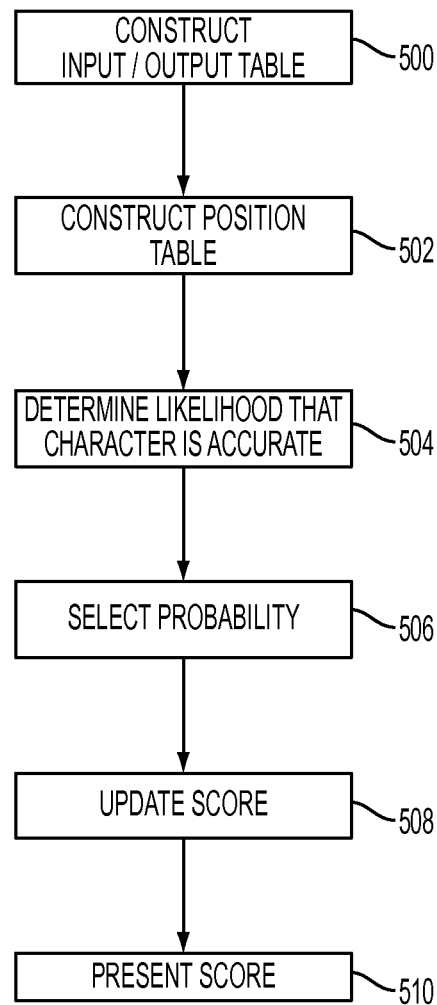
FIG. 5 illustrates an example process for determining the most likely characters according to an embodiment.

FIG. 5 illustrates a flow chart of an example method of determining an input character according to an embodiment. As illustrated by FIG. 5, an input/output table may be constructed 500 for a particular student or individual. An input/output table may be constructed 500 as discussed above. FIG. 4A illustrates an example portion of an input/output table according to an embodiment.

Referring back to FIG. 5, a position table may be constructed 502. FIG. 4B illustrates an example portion of a position table according to an embodiment. A position table may include one or more probabilities associated with one or more pairs of characters based on their position in a character string. For example, FIG. 4B shows example probabilities that, if a character identified along the horizontal axis of the table is in a first position in a character string, the probability that a character identified along the vertical axis of the table is the second character in the string. For instance, as illustrated by FIG. 4B, if 'w' is the first character is a string, there is a 25% likelihood that 'o' is the second character in the string. As another example, if 'e' is the first character in a string, there is a 97% likelihood that 'w' is the second character in the string.

In an embodiment, a position table may be constructed 502 for a particular student or other individual. For example, a student may complete one or more calibration forms. The handwriting on the calibration forms may be used by an education assessment system to generate an position table. Alternatively, a position table may be constructed using a particular reference. For instance, a dictionary or other reference guide may be used to construct 502 a position table.

Referring back to FIG. 5, a character string may be received 504 by an education assessment system. The character string may be output from applying character recognition, such as ICR, to an assessment. The system may determine 504 the likelihood that a character in the string is accurate based on at least the subsequent character in the string. For example, a system may receive the string "ke" as output from applying ICR. However, the correct answer to an assessment question may be "we." The system may determine the likelihood that the character "k" is accurate given the subsequent character "e".

In an embodiment, the system may determine the likelihood that a character in the string is accurate using a probability theorem, such as Bayes theorem. Bayes theorem as applied to this context may be represented as:

$$P(w|k_{meas\_1st}, e_{meas\_2nd}) = \frac{P(k_{meas\_1st}|w)P(e_{meas\_2nd}|w)}{P(w)}$$

where $P(w|k_{meas\_1st}, e_{meas\_2nd})$ represents an ultimate probability which is the probability that the first character in the string is actually a 'w' if the received output is a "ke";

$P(k_{meas\_1st}|w)$ represents the probability that a 'k' was determined by the system as the first character in the string if the true first character is a 'w'

$P(e_{meas\_2nd}|w)$ represents the probability that an 'e' was determined by the system as the second character in the string if the true first character is a 'w'

$P(w)$ represents the probability that the particular student wrote a 'w' as the first character In certain embodiments, the applied probability theorem may not be normalized. For example, Bayes' theorem may be represented as $$P(w|k_{meas\_1st}, e_{meas\_2nd}) = P(k_{meas\_1st}|w)P(e_{meas\_2nd}|w)P(w).$$

In an embodiment, $P(k_{meas\_1st}|w)$ may be determined using the input/output table. For example, referring to FIG. 4A, the probability that a 'k' was determined when the true input is a 'w' is shown in FIG. 4A to be 0.10.

In an embodiment, $P(e_{meas\_2nd}|w)$ may be determined using values from the input/output table and the position table. For example, the $P(e_{meas\_2nd}|w)$ may be represented as $$P(e_{meas\_2nd}|w) = (P_{w,option1} * P_{option1\ is\ interpreted\ as\ an\ e}) + \ldots + (P_{w,optionN} * P_{optionN\ is\ interpreted\ as\ an\ e})$$

where:

Option 1 . . . option N represent the set of possible characters;

$P_{w,\ option1}$ represents the probability that, if a w is in a first position, that the character in the second position is option 1; and $P_{option1\ is\ interpreted\ as\ an\ e}$ represents the probability that, if option 1 is measured, that it is interpreted by the system as an 'e'

In certain embodiments, $P_{w,\ option1}$ may be obtained from the position table and $P_{option1\ is\ interpreted\ as\ an\ e}$ may be obtained from the input/output table.

Referring to the above example, $P(e_{meas\_2nd}|w)$ may be solved as follows:

$$P(e_{meas\_2nd}|w) = (P_{w,w} * P_{w\ is\ interpreted\ as\ an\ e}) + (P_{w,o} * P_{o\ is\ interpreted\ as\ an\ e}) + (P_{w,e} * P_{e\ is\ interpreted\ as\ an\ e}) + (P_{w,k} * P_{k\ is\ interpreted\ as\ an\ e}) = (0.01 * 0.02) + (0.08 * 0.03) + (0.9 * 0.92) + (0.01 * 0) = (0.0002 + 0.0024 + 0.828 + 0) = 0.8306$$

As such, the probability that the second character is an 'e' when the true input is 'w' is approximately 0.83.

In an embodiment, $P(w)$ may be determined based on information known about the student. For instance, $P(w)$ may be determined based on historical assessment data for a student. The historical assessment data may include grade information for the student over a period of time. Historical assessment data may also pertain to a certain subject. For instance, an assessment may be a history quiz. The education assessment system may determine that, based on historical assessment data, that the student is a C student in math. As such, the system may assign a probability $P(w)=0.75$, which may correspond to a C grade.

In certain embodiments, $P(k_{meas\_1st}|w)P(e_{meas\_2nd}|w)P(w)$ may be normalized by a particular value. For instance, $P(k_{meas\_1st}|w)P(e_{meas\_2nd}|w)P(w)$ may be normalized by the value $P(k_{meas\_1st})P(e_{meas\_2nd})$, where $P(k_{meas\_1st})$ represents the probability of determining a 'k' as the first character and $P(e_{meas\_2nd})$ represents the probability of determining an 'e' as the second character. In other embodiments, the value of $P(k_{meas\_1st}|w)P(e_{meas\_2nd}|w)P(w)$ may not be normalized.

Assuming $P(k_{meas\_1st}|w)P(e_{meas\_2nd}|w)P(w)$ is not normalized, the above example may be solved by the following: (0.1*0.83*0.75)=0.062. As such, there is a probability proportional to 0.062 that, if the true input was a 'w', that the system interpreted a 'k' in a first position and an 'e' in a second position.

Referring back to FIG. 5, the system may determine 504 the likelihood that a character in the string is accurate based on at least the subsequent character in the string for one or more possible characters. For instance, if the character is a letter, the system may determine 504 that a character in the string is accurate for all possible characters in the alphabet. For example, referring to the above example, the possible characters are 'w', 'o', 'e', and 'k'. Additional and/or alternate possible characters may be used within the scope of this disclosure. As such, the system may determine one or more of the following: $P(o|k_{meas\_1st}, e_{meas\_2nd})$, $P(e|k_{meas\_1st}, e_{meas\_2nd})$, and $P(k|k_{meas\_1st}, e_{meas\_2nd})$.

Although the above examples refer to a first and second character of a string, it is understood that any consecutive characters in a string may be evaluated in a manner similar to that described above.

In an embodiment, the system may select 506 the probability having the highest value. If the system selects 506 a probability that is not associated with the proposed first character value, then the system may update 508 a score associated with the assessment. For instance, the system may give the student credit for a correct answer and may update 508 or adjust the score appropriately. In certain embodiments, the system may present 510 an administrator, such as a teacher or other educator, with the assessment score. For instance, the system may cause the score to be displayed on a display device, or may generate a report that includes the assessment score.

Figure 6:
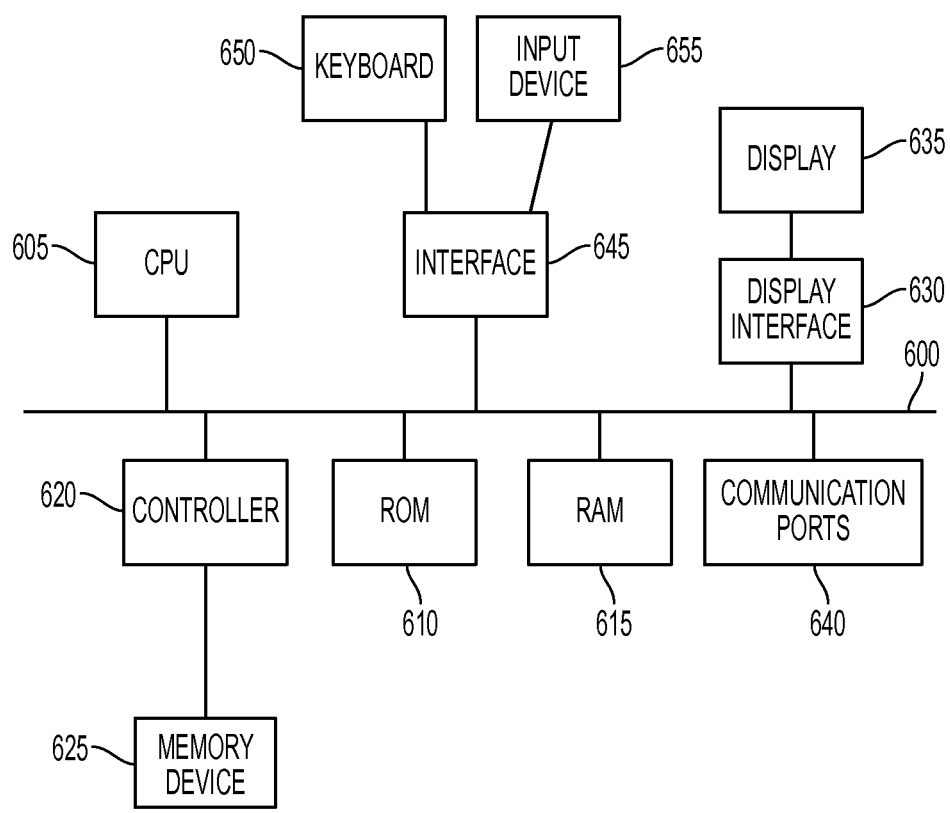
FIG. 6 illustrates a block diagram of example hardware that may be used to contain or implement program instructions according to an embodiment.

FIG. 6 depicts a block diagram of internal hardware that may be used to contain or implement the various computer processes and systems as discussed above. An electrical bus 600 serves as the main information highway interconnecting the other illustrated components of the hardware. CPU 605 is the central processing unit of the system, performing calculations and logic operations required to execute a program. For example, CPU 605 may perform the functions performed by the processing device in the above discussion of FIGS. 1, 2 and 5. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 630 may permit information from the bus 600 to be displayed on the display 635 in audio, visual, graphic or alphanumeric format. Communication with external devices may occur using various communication ports 640. A communication port 640 may be attached to a communications network, such as the Internet or a local area network.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of determining an input character based upon character recognition output of an education assessment system, the method comprising:
   receiving, by a processing device, a proposed value generated using character recognition, wherein the proposed value is associated with at least one handwritten character of an assessment; and
   determining, by the processing device, whether the proposed value is correct, by:
      determining a posterior probability associated with each of one or more possible characters,
      identifying the possible character associated with the posterior probability having a highest value, and
      in response to identifying the proposed value as the possible character associated with the posterior probability having a highest value, determining, by the processing device, that the proposed value is correct, otherwise, determining that the proposed value is incorrect.

2. The method of claim 1, wherein determining a posterior probability associated with each of one or more possible characters comprises:
   determining a probability of evidence value;
   determining a prior probability value;
   determining a prior probability of evidence value;
   determining a product of the probability of evidence value and prior probability value;
   determining a ratio of the product and the prior probability of evidence value.

3. The method of claim 1, wherein determining a posterior probability associated with each of one or more possible characters comprises:
   determining a probability of evidence value;
   determining a prior probability value;
   determining a prior probability of evidence value; and
   determining a product of the probability of evidence value and prior probability value.

4. The method of claim 3, further comprising:
constructing an input/output table comprising one or more probabilities, wherein each probability is associated with a true value and one or more character recognition proposed values,
wherein determining a probability of evidence value comprises identifying the probability from the input/output table that corresponds to the proposed value and the possible character.

5. The method of claim 3, wherein determining a prior probability value comprises:
determining historical assessment data associated with a student who completed the assessment; and
determining the prior probability value based on at least a portion of the historical assessment data.

6. The method of claim 1, further comprising updating a score associated with the assessment in response to determining that the proposed value is incorrect.

7. A method of determining one or more input characters based upon character recognition output of an education assessment system, the method comprising:
receiving, by a processing device, a proposed character string generated using character recognition, wherein the proposed character string is associated with a plurality of handwritten characters of an assessment of a student, wherein the proposed character string comprises a first proposed character and a second proposed character;
identifying one or more possible characters;
determining, by the processing device, whether the first proposed character is correct, by, for one or more of the possible characters, determining an ultimate probability that the first proposed character is the possible character given the character string by:
determining a first probability equal to a probability that if a true value of the first proposed character is the possible character that the first proposed character was identified,
determining a second probability equal to a probability that if the true value of the first proposed character is the possible character that a following character is the second proposed character,
determining a third probability equal to a probability that the student wrote the possible character, and
determining a product of the first probability, the second probability and the third probability; and
selecting the ultimate probability having the highest value.

8. The method of claim 7, further comprising:
determining a fourth probability equal to a probability that the first proposed character was identified;
determining a fifth probability equal to a probability that the second proposed character was identified;
determining a second product by multiplying the fourth probability and the fifth probability; and
determining a ratio of the product and the second product.

9. The method of claim 7, further comprising:
constructing an input/output table comprising one or more probabilities, wherein each probability is associated with a true value and one or more character recognition proposed values,
wherein determining the first probability comprises identifying a probability from the input/output table that corresponds to the first proposed character and the possible character.

10. The method of claim 7, wherein determining a second probability comprises:
identifying one or more pairs that each comprise the possible character and a second possible character from the identified possible characters;
for each pair, determining a fourth probability by:
determining a fifth probability that the second possible character follows the possible character,
determining a sixth probability that the if the second possible character is actually given that it is interpreted as the second proposed character, and
determining a product of the fifth probability and the sixth probability; and
summing the fourth probabilities associated with each identified pairs.

11. The method of claim 7, wherein determining the third probability comprises
determining historical assessment data associated with the student who completed the assessment; and
determining the third probability based on at least a portion of the historical assessment data.

12. The method of claim 7, further comprising, in response to identifying the first proposed character as the possible character having the highest ultimate value, determining, by the processing device, that the first proposed character is correct.

13. The method of claim 7, further comprising, in response to not identifying the first proposed character as the possible character having the highest ultimate value, determining, by the processing device, that the first proposed character is incorrect.

14. The method of claim 13, further comprising updating a score associated with the assessment in response to determining that the first proposed character is incorrect.

15. A system of determining an input character based upon character recognition output, the system comprising:
a computing device; and
a non-transitory computer-readable storage medium in communication with the computing device, wherein the computer-readable storage medium comprises one or more programming instructions that, when executed, cause the computing device to:
receive a proposed value generated using character recognition, wherein the proposed value is associated with at least one handwritten character of an assessment, and
determine whether the proposed value is correct, by:
determining a posterior probability associated with each of one or more possible characters,
identifying the possible character associated with the posterior probability having a highest value, and
in response to identifying the proposed value as the possible character associated with the posterior probability having a highest value, determining, by the processing device, that the proposed value is correct, otherwise, determining that the proposed value is incorrect.

16. The system of claim 15, wherein the one or more programming instructions that, when executed, cause the computing device to determine a posterior probability associated with each of one or more possible characters comprise one or more programming instructions that, when executed, cause the computing device to:
determine a probability of evidence value;
determine a prior probability value;
determine a prior probability of evidence value;
determine a product of the probability of evidence value and prior probability value; and determine a ratio of the product and the prior probability of evidence value.

17. The system of claim 15, wherein the one or more programming instructions that, when executed, cause the computing device to determine a posterior probability associated with each of one or more possible characters comprise one or more programming instructions that, when executed, cause the computing device to:
   determine a probability of evidence value;
   determine a prior probability value;
   determine a prior probability of evidence value; and
   determine a product of the probability of evidence value and prior probability value.

18. The system of claim 17, wherein the computer-readable storage medium further comprises one or more programming instructions that, when executed, cause the computing device to:
   construct an input/output table comprising one or more probabilities, wherein each probability is associated with a true value and one or more character recognition proposed values,
   wherein the one or more programming instructions that, when executed, cause the computing device to determine a probability of evidence value comprise one or more programming instructions that, when executed, cause the computing device to identify the probability from the input/output table that corresponds to the proposed value and the possible character.

19. The system of claim 17, wherein the one or more programming instructions that, when executed, cause the computing device to determine a prior probability value comprise one or more programming instructions that, when executed, cause the computing device to:
   determine historical assessment data associated with a student who completed the assessment; and
   determine the prior probability value based on at least a portion of the historical assessment data.

20. The system of claim 15, wherein the computer-readable storage medium further comprises one or more programming instructions that, when executed, cause the computing device to update a score associated with the assessment in response to determining that the proposed value is incorrect.

21. A system of determining one or more input characters based upon character recognition output, the system comprising:
   a computing device; and
   a non-transitory computer-readable storage medium in communication with the computing device, wherein the computer-readable storage medium comprises one or more programming instructions that, when executed, cause the computing device to:
      receive a proposed character string generated using character recognition, wherein the proposed character string is associated with a plurality of handwritten characters of an assessment of a student, wherein the proposed character string comprises a first proposed character and a second proposed character,
      identify one or more possible characters,
      determine whether the first proposed character is correct, by, for one or more of the possible characters, determining an ultimate probability that the first proposed character is the possible character given the character string by:
         determining a first probability equal to a probability that if a true value of the first proposed character is the possible character that the first proposed character was identified,
         determining a second probability equal to a probability that if the true value of the first proposed character is the possible character that a following character is the second proposed character,
         determining a third probability equal to a probability that the student wrote the possible character, and
         determining a product of the first probability, the second probability and the third probability; and
      select the ultimate probability having the highest value.

22. The system of claim 21, wherein the computer-readable storage medium further comprises one or more programming instructions that, when executed, cause the computing device to:
   determine a fourth probability equal to a probability that the first proposed character was identified;
   determine a fifth probability equal to a probability that the second proposed character was identified;
   determine a second product by multiplying the fourth probability and the fifth probability; and
   determine a ratio of the product and the second product.

23. The system of claim 21, wherein the computer-readable storage medium further comprises one or more programming instructions that, when executed, cause the computing device to:
   construct an input/output table comprising one or more probabilities, wherein each probability is associated with a true value and one or more character recognition proposed values,
   wherein the one or more programming instructions that, when executed, cause the computing device to determine the first probability comprise one or more programming instructions that, when executed, cause the computing device to identify a probability from the input/output table that corresponds to the first proposed character and the possible character.

24. The system of claim 21, wherein the one or more programming instructions that, when executed, cause the computing device to determine a second probability comprise one or more programming instructions that, when executed, cause the computing device to:
   identify one or more pairs that each comprise the possible character and a second possible character from the identified possible characters;
   for each pair, determine a fourth probability by:
      determining a fifth probability that the second possible character follows the possible character,
      determining a sixth probability that the if the second possible character is actually given that it is interpreted as the second proposed character, and
      determining a product of the fifth probability and the sixth probability; and
   summing the fourth probabilities associated with each identified pairs.

25. The system of claim 21, wherein one or more programming instructions that, when executed, cause the computing device to determine the third probability comprise one or more programming instructions that, when executed, cause the computing device to:
   determine historical assessment data associated with the student who completed the assessment; and
   determine the third probability based on at least a portion of the historical assessment data.

26. The system of claim 21, wherein the computer-readable storage medium further comprises one or more programming instructions that, when executed, cause the computing device to, in response to identifying the first proposed character as the possible character having the highest ultimate value, determine that the first proposed character is correct.

27. The system of claim 21, wherein the computer-readable storage medium further comprises one or more programming instructions that, when executed, cause the computing device to, in response to not identifying the first proposed character as the possible character having the highest ultimate value:
   determine that the first proposed character is incorrect; and
   update a score associated with the assessment in response to determining that the first proposed character is incorrect.

* * * * *